Aug. 11, 1964
G. A. WOOD, JR
3,144,217
FISHING REEL
Filed Aug. 12, 1957
3 Sheets-Sheet 1
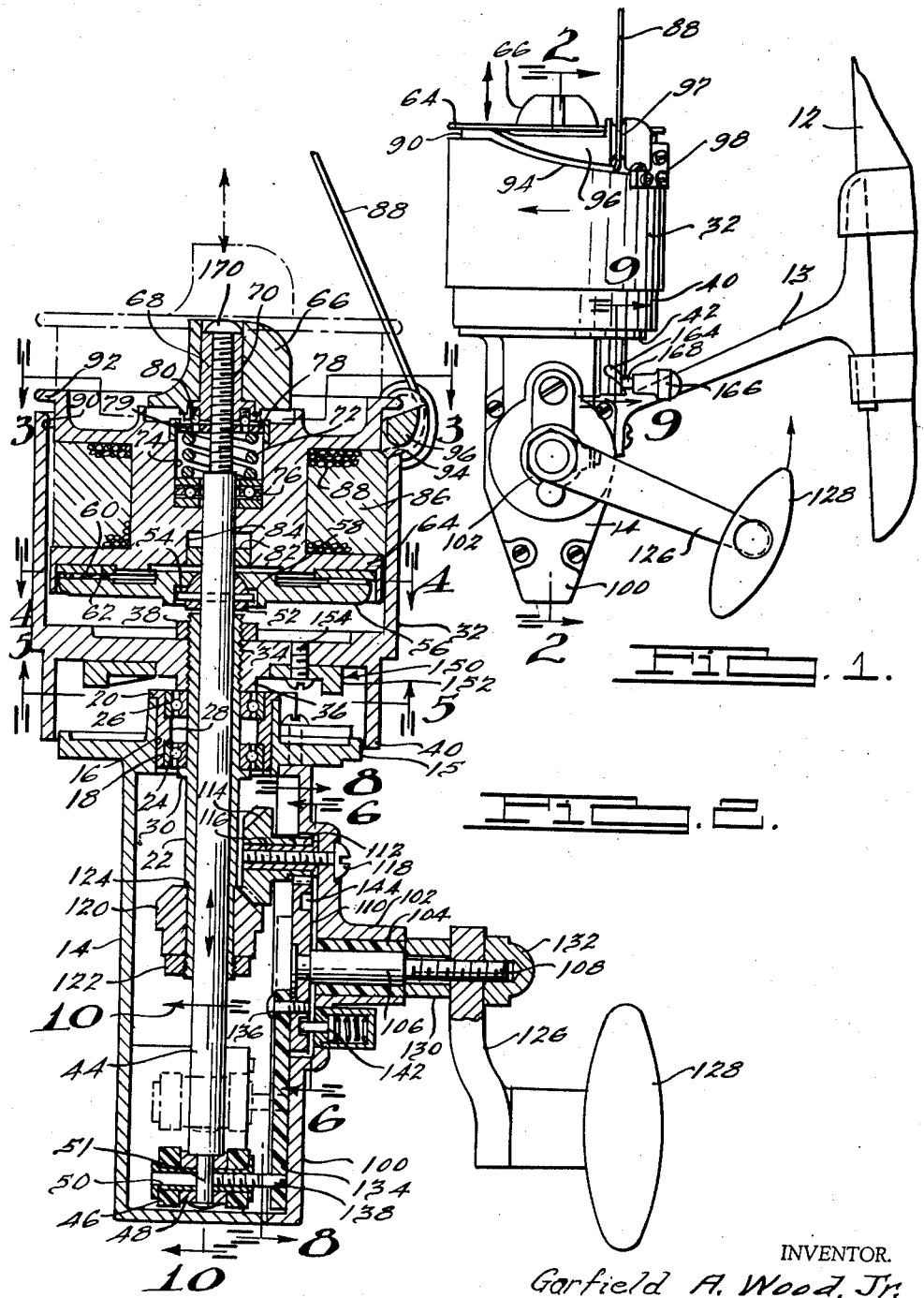
INVENTOR.
Garfield A. Wood, Jr.
BY
Harness, Dickey & Pierce
ATTORNEYS.

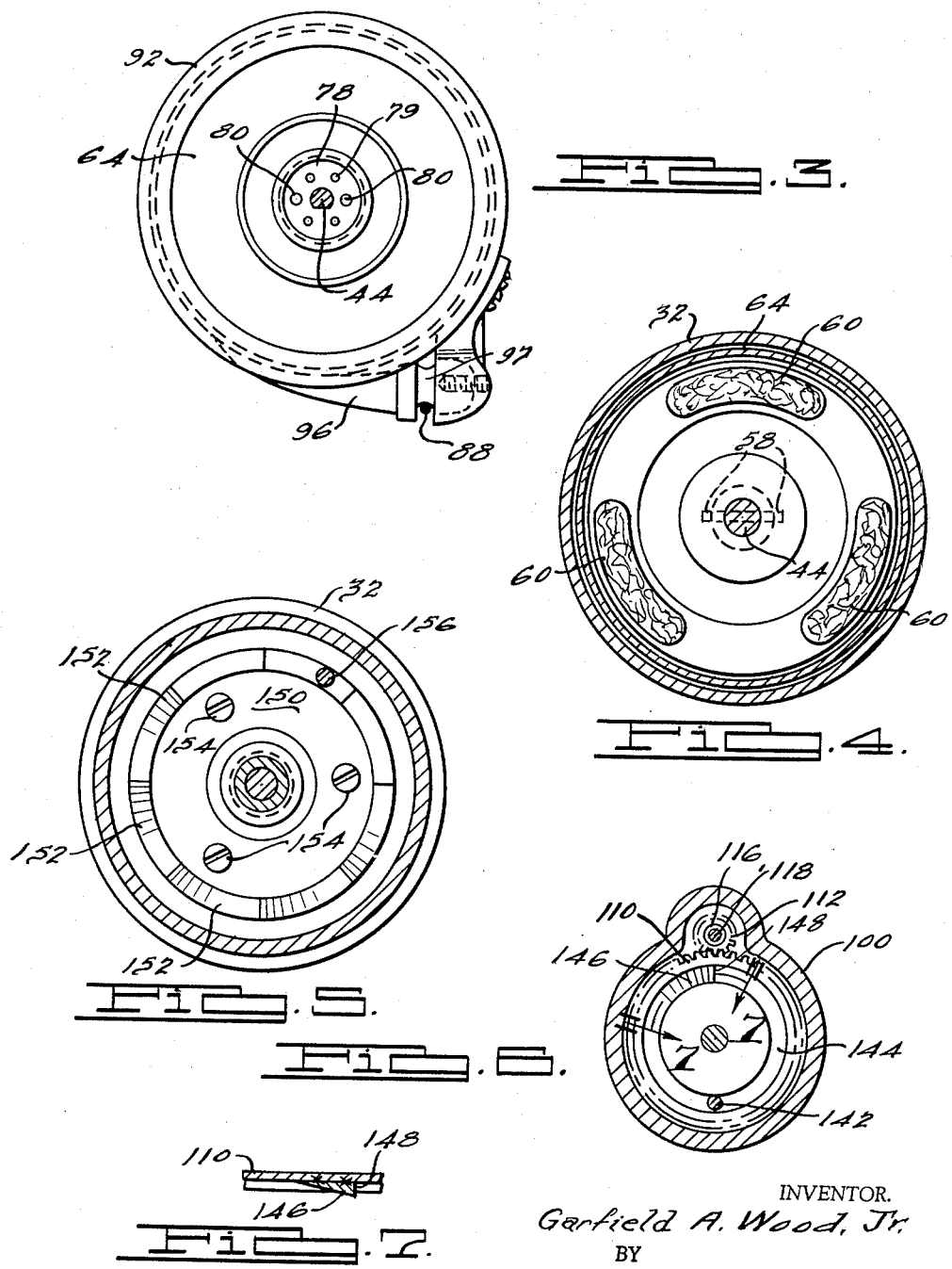

Aug. 11, 1964    G. A. WOOD, JR    3,144,217
FISHING REEL
Filed Aug. 12, 1957    3 Sheets-Sheet 3
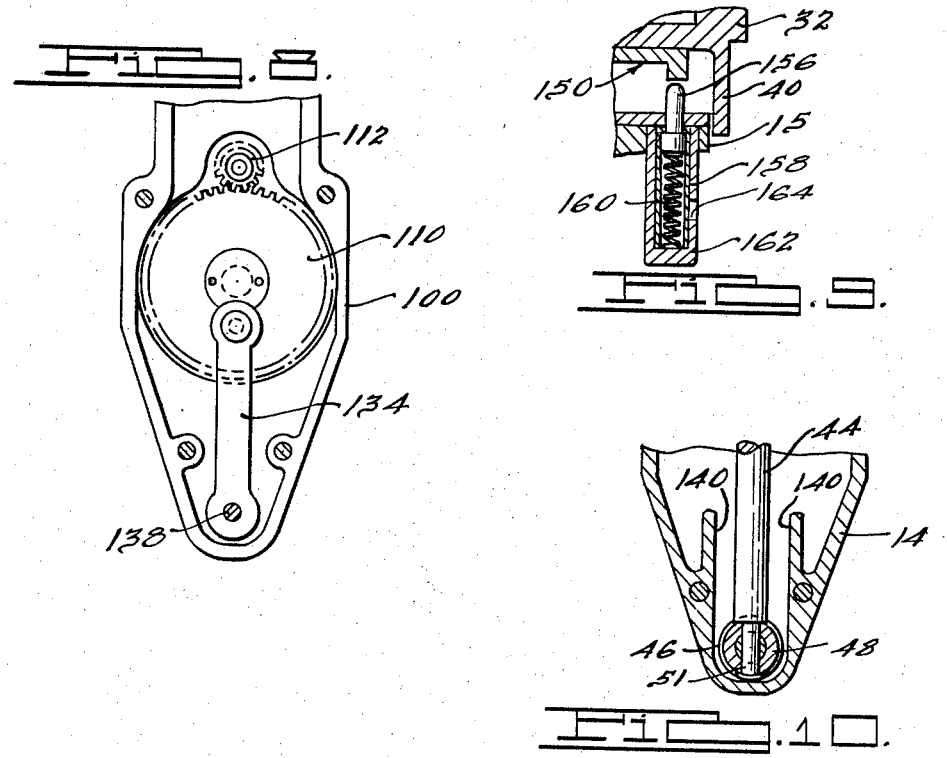
INVENTOR.
Garfield A. Wood, Jr.
BY
Harness, Dickey & Pierce
ATTORNEYS.

United States Patent Office 3,144,217
Patented Aug. 11, 1964

3,144,217
FISHING REEL
Garfield A. Wood, Jr., 785 NE. 83rd Terrace, Miami, Fla.
Filed Aug. 12, 1957, Ser. No. 677,427
2 Claims. (Cl. 242—84.21)

This invention relates to fishing reels and particularly to a fishing reel of the spinning reel type having a rigidly mounted bale finger.

Fishing reels of the spinning reel type have a tubular body rotatably mounted on a housing with the spool slidably mounted on the housing in axial alignment with the tubular body, and means for simultaneously rotating the body and reciprocating the spool in and out of the body. A bale is generally pivotally mounted on the tubular body for engaging the fishing line in a manner to enable the rotation of the body to wind the line about the spool, the simultaneous reciprocation of the spool relative to the rotating body serving to distribute the line over the spool.

In order to cast with such a spinning reel, the bale is pivoted out of engagement with the line so that the line is free to be puled off the spool in an axial direction when the cast is made. Conversely, in order to reel the line in, the bale must be pivoted back into engagement with the line.

The main objects of this invention are to provide a spinning reel having a bale finger rigidly mounted thereon for engaging and winding the fishing line about the spool; to provide a spinning reel having a rigidly mounted bale finger adapted to cooperate with a portion of the spool to positively pick up the fishing line; to provide a spinning reel having a ratchet device for positioning the reel in the casting position wherein the spool is furthest removed from the bale finger; to provide a spinning reel that prevents rotation of the spool in a manner to reduce friction and to cooperate with the gear drive to facilitate the combination rotary and reciprocal motion; to provide a brake which does not apply a braking action when the fishing line is reeled in; and to provide a spinning reel that is rugged in construction, positive in operation and economical of manufacture.

Other objects and features of novelty of the invention will be specifically pointed out or will otherwise become apparent when referring, for a better understanding of the invention, to the following description taken in conjunction with the accompanying drawings, wherein:

FIGURE 1 is an elevational view of a spinning reel embodying features of the invention;

FIG. 2 is an enlarged sectional view of the structure illustrated in FIG. 1, taken along the line 2—2 thereof;

FIG. 3 is a sectional view of the structure illustrated in FIG. 2, taken along the line 3—3 thereof;

FIG. 4 is a sectional view of the structure illustrated in FIG. 2, taken along the line 4—4 thereof;

FIG. 5 is a sectional view of the structure illustrated in FIG. 2, taken along the line 5—5 thereof;

FIG. 6 is a sectional view of the structure illustrated in FIG. 2, taken along the line 6—6 thereof;

FIG. 7 is a sectional view of the structure illustrated in FIG. 6, taken along the line 7—7 thereof;

FIG. 8 is a sectional view of the structure illustrated in FIG. 2, taken along the line 8—8 thereof;

FIG. 9 is a sectional view of the structure illustrated in FIG. 1, taken along the line 9—9 thereof; and FIG. 10 is a sectional view of the structure illustrated in FIG. 2, taken along the line 10—10 thereof.

Referring to FIGS. 1 and 2, one embodiment of the invention is comprised of an elongated housing 14 mounted on a fishing pole 12 by a bracket 13. The housing 14 has a circular flange 15 on the upper end thereof with an aperture 16 axially disposed therein. A sleeve 18 with an annular lip 20 is disposed in the aperture 16, and a hollow shaft 22 is journaled within the sleeve 18 by a pair of ball bearings 24 and 26 spaced apart by an internal boss 28 on the sleeve 18. The ball bearing 24 is prevented from moving longitudinally by a flange 30 on the shaft 22. A cylindrical tubular body 32 is screwed on the upper end of the shaft 22 on thread 34 with a boss 36 abutting against the ball bearing 26 to prevent it from moving longitudinally. A lock nut 38 is screwed on to the thread 34 to lock the tubular body 32 in position. It will be observed that the tubular body 32 has a downwardly projecting tubular flange 40 which slightly overlaps the circular flange 15 to enclose and conceal the components therein.

A stem 44 is slidably disposed within the hollow shaft 22 and is prevented from rotating by a pair of rollers 46 spaced apart by a spacer 48 which extends therethrough. A reduced end 51 of the stem passes through the spacer 48 and bushing 50 and secures them to the stem when the end 51 is headed. A hemispherically shaped member 52 is secured to the stem 44 by a pin 54 passing through the member 52 and the stem 44. A disc-shaped brake 56 is mounted on the member 52 for universal movement and, as most clearly shown in FIG. 4, has diametrically opposed notches 58 therein for receiving the ends of the pin 54 to key the brake against rotation relative to the stem 44. Three arcuate braking pads 60 are circumferentially spaced on the upper face of the brake 56 and bear against an annular ring 62, of suitable composition, to provide a braking surface.

The annular ring 62 is concentrically mounted on the underside of a spool 64 which is rotatably mounted on the upper end of the stem 44 within the cylindrical tubular body 32. A knob 66 having an internally threaded bushing 68 axially mounted therein is screwed upon a thread 70 on the D-shaped reduced upper end portion of the stem 44. A compression spring 72 is disposed within a counterbore 74 in the spool 64, the lower end of which bears against a thrust bearing 76 and the upper end of which bears against an axially movable nonrotatable detent washer 78 which cooperates with a plurality of spring mounted balls 80 disposed within spaced apertures in the lower face of the bushing 68. This enables the knob 66 to be rotated relative to the washer 78 to be secured in position by the balls 80 when resting in detents 79 of the washer 78. A bearing 82, disposed within a counterbore 84 in the lower face of the spool 64, provides additional rotative support for the spool.

It will be observed that the spool 64 has a large annular recess 86 therein for receiving the windings of a fishing line 88, and also has an annular wall portion 90 surmounted by a lip 92 on the upper end thereof. A portion 94 of the tubular body 32 is cut away, and a curved finger 96 is mounted adjacent thereto by screws 98 so that the end of the finger closely overlies the annular wall portion 90 when the spool 64 is in its retracted position as will be described in detail hereinafter.

It will be observed from the foregoing description that the hollow shaft 22 and the cylindrical tubular body 32 are mounted for rotation relative to the housing 14, the stem 44, and the spool 64, and that the stem 44 is free to reciprocate within the hollow shaft 22. It will also be observed that the brake 56 is keyed to the stem 44 by the pin 54 in a universal manner and that the spool 64 is urged into abutting relationship with the brake by the spring 72. The thrust bearing 76 enables the spool to rotate relative to the stem 44 with a minimum of interference from the spring 72 when the fishing line is run out by a fish, as will be described in greater detail hereinafter.

One side of the housing 14 is provided with a removable cover 100 having a projecting boss 102 thereon with a bearing 104 disposed therein. A shaft 106 having a thread 108 on one end and a gear 110 on the other end is rotatably supported within the bearing 104. A unitary pinion gear 112 and a bevel gear 114 are rotatably mounted on an internally threaded sleeve bearing 116 secured to the inner face of the cover 100 by a screw 118 so that the pinion gear 112 meshes with and is driven by the gear 110. The bevel gear 114 meshes with and drives a bevel gear 120 secured to the lower end of the hollow shaft 22 and locked in position by a nut 122. An arm 126 having a handle 128 for rotating the gear 110 is screwed onto the thread 108 of the shaft 106 between a spacer 130 and a nut 132.

The upper end of a link 134 is eccentrically pivoted to the gear 110 by a screw 136 and the lower end of the link is pivoted to the lower end of the stem 44 by a pin 138 having one end screwed into the bushing 50. Consequently, the link 134 changes the rotary movement of the gear 110 to reciprocal movement of the stem 44 which in turn reciprocates the spool 64 relative to the tubular body 32.

Referring to FIG. 10, it will be observed that the lower portion of the housing 14 has parallel internal walls 140 which serve as guides for the rollers 46 on the end of the stem 44 for preventing the rotation of the stem 44 relative to the housing 14. By providing two rollers 46, one of the rollers will always be in contact with one of the walls 140 an the other roller will be in contact with the other wall 140 regardless of the direction in which the stem 44 tends to rotate. It is apparent that the rollers will thus reduce friction and prevent rotation of the stem 44 in an effective manner to facilitate the reciprocation of the stem 44.

Referring to FIGS. 2, 6 and 7, a spring biased plunger 142 is mounted on the removable cover 100 to project into an annular recess 144 in the face of the gear 110. A ratchet-like tooth 146 is disposed within the annular recess 144 and cooperates with the spring mounted plunger 142 to stop the rotation of the gear 110 when the plunger 142 engages the face 148 of the tooth. Thus, the gear 110 is free to rotate in a counterclockwise direction as viewed in FIG. 6, but can only rotate in a clockwise direction to the point where the plunger 142 engages the face 148 of the tooth 146. In addition to the ratchet tooth 146, a disc 150 having a plurality of ratchet teeth 152 projecting axially therefrom is coaxially mounted on the undersurface of the tubular body 32 by screws 154 as illustrated in FIGS. 2 and 5. A plunger 156 is disposed within a tubular body 158 which contains a spring 160 for urging the plunger 156 upwardly. The tubular body 158 is in turn disposed within a tubular casing 162 which extends downwardly from the circular flange 15 to which it is secured. The plunger 156 is adapted to cooperate with the ratchet teeth 152 to permit rotation of the tubular body 32 in a counterclockwise direction as viewed in FIG. 5 and to prevent rotation in a clockwise direction.

As clearly illustrated in FIG. 1, a spiral groove 164 is formed through the wall of the tubular casing 162 and a cylindrical projection 168 having a knob 166 extends through the spiral groove and is fastened to the body 158 so as to cooperate wtih the spiral groove 164 to cam the body 158 axially. When the body 158 is cammed to its uppermost position, the plunger 156 is in position to cooperate wtih the ratchet teeth 152. However, when the body 158 is cammed downwardly, the plunger 156 clears the ratchet teeth 152 so that the tubular body 32 is free to rotate in either direction. This construction enables the tubular body 32 to be locked against rotation in a manner that avoids stress on the gearing, as will be described in greater detail hereinafter.

When operating the reel, the knob 166 is shifted to its lowermost position as shown in FIG. 1 with the plunger 156 out of engagement with the ratchet teeth 152 so that it cannot interfere with the rotation of the tubular body 32. The handle 128 is then rotated in a clockwise direction as viewed in FIG. 1 until the spring biased plunger 142, most clearly illustrated in FIG. 2, engages the ratchet tooth 146 on the gear 110 to prevent further rotation of the handle 128. Rotating the handle to this position rotates the gear 110 which in turn causes the link 134 to move the stem 44 and spool 64 to its uppermost position as illustrated by the dot and dash lines in FIG. 2. Of course, while the handle 128 is rotating, the gear 110 will drive the pinion gear 112 and the bevel gear 114 which in turn drives the bevel gear 120 to rotate the shaft 22 and the tubular body 32 mounted thereon relative to the spool 64. The handle 128 is then held in this position, which is the casting position, and the fishing line 88 is then manually disengaged from the finger 96. When the cast is made, the line 88 is free to pay off the spool 64 in a generally axial direction while the spool and tubular body 32 remain stationary.

After the cast has been made, the handle 128 is rotated in a counterclockwise direction as viewed in FIG. 1 which reciprocates the stem 44 and spool 64 relative to the tubular body 32, and also rotates the tubular body 32 relative to the spool, the tubular body, of course, rotating in a clockwise direction about the spool 64 when viewed as in FIG. 3. This enables the end of the finger 96 to positively and surely pick up the line 88 and guide it to a position over a pulley 97 as illustrated in FIG. 1. The pulley 97 reduces the friction encountered by the line 88 as it is reeled in or payed out.

The finger 96 unfailingly engages the line 88 because a portion of the line always overlies the annular wall portion 90 in a generally axial direction and is inherently spaced therefrom by virtue of the fact that it extends over the lip 92. It is apparent that because of the presence of the lip 92, the line 88 cannot lie flush against the wall portion 90. Therefore, when the finger 96 is rotated relative to the annular wall portion 90, it will necessarily move between the wall portion and the line 88 to engage the line since the pointed end of the finger closely follows the surface of the annular wall portion 90. To insure that the finger 96 will inherently pick up the line in this manner, the axial length of the annular wall portion 90, the ratios of the gears, and the eccentric position of the screw 136 are correlated to insure that the end of the finger 96 will overlie the annular wall portion 90 for at least one full turn of the finger relative to the spool, and preferably slightly in excess of a full turn.

For example, if the spool is in the position shown in dot and dash lines in FIG. 2, rotation of the handle 128 in a counterclockwise direction will not only move the spool downwardly relative to the tubular body 32 but will also move the finger 96 clockwise about the spool when viewed as in FIG. 3. Therefore, a position will be reached wherein the end of the finger 96 is adjacent to the bottom of the annular wall portion 90. It is from this point on that the end of the finger must overlie the annular wall portion 90 for at least one complete revolution since the line 88 may bridge the wall portion and the lip 92 at any point on their circumference.

With the end of finger 96 overlying the bottom of the wall portion 90, further rotation of the handle 128 will rotate the finger about the wall portion as the spool continues to retract to the position shown in FIGS. 1 and 2, after which it will reverse itself and move upwardly. However, before it moves upwardly a sufficient distance so that the end of the finger 96 does not overlie the wall portion 90 but overlies the groove 86, the finger will have made slightly more than one complete revolution relative to the spool 64 so that it necessarily picks up the line 88 and guides it to the position shown in FIG. 1. Thus, it will be seen that by a simple, rigidly secured finger, or any equivalent means since the particular finger design is not essential, the line 88 is unfailingly picked up.

In order to prevent the possibility of the line 88 being suddenly drawn out by a fish when the fisherman does not have a firm grasp on the handle 128, the knob 166 shown in FIG. 1 is actuated so that the spring biased plunger 156 is cammed into cooperating relationship with the ratchet teeth 152 to prevent counterclockwise rotation of the tubular body 32, as viewed in FIG. 3, while permitting clockwise rotation to enable the fish to be reeled in.

The plunger 156 must be capable of being moved to a position wherein it cannot engage the ratchet teeth 152 in order to permit the handle 128 to be rotated clockwise as viewed in FIG. 1 so that the spool can be moved to the casting position, shown by the dot and dash lines in FIG. 2. As previously described, the spring mounted plunger 142 of FIG. 2 engages the ratchet tooth 146, as most clearly shown in FIGS. 6 and 7, to stop the rotation of the handle 128 when the casting position is reached.

It is apparent that by providing the plunger 156 the strain of any sudden loads caused by the fish may be absorbed by the disc 150 to prevent the shock from being transmitted through the gears as would be the case if the handle 128 were held against rotation or permitted to be rotated until the spring biased plunger 142 engaged the tooth 146.

After a fish has been hooked and starts running out the line, the spool 64 will rotate on the stem 44 against the resistance supplied by the brake disc 56. The fisherman may rotate the knob 66 to increase the braking action by increasing the compressive force on the spring 72, or he may decrease the braking action by rotating the knob 66 in the opposite direction. This is, of course, within the discretion of the fisherman, and once the fish has been stopped by the brake, the handle 128 may be rotated to start winding the line in by rotating the finger 96 about the spool and simultaneously reciprocating the spool relative to the tubular body 32. To insure that the line is properly disposed over the spool, the gear ratios are such as to lay the convolutions of the line properly on the spool 64.

By mounting the brake disc 56 on the hemispherical member 52, a sufficient universal motion is provided between the brake disc and the stem 44 to insure that each of the three arcuate braking pads 60 are always in contact with the annular ring 62 mounted on the underside of the spool 64. This feature provides a dependable, smooth braking action for bringing the fish to a halt as it is running out the line and overcomes the binding problem that so often occurs when the brake disc is rigidly mounted so that only one of the brake pads 60 may be in contact with the annular ring 62. It will be appreciated that a rough braking action can easily permit the fish to snap the line.

Further by providing a ball thrust bearing 76, the friction is greatly reduced at this point and consequently less heat is generated by the relative rotation between the spool and the spring 72. This prevents the warping that often occurs between the friction surfaces at this point which also often causes a binding action that interferes with braking the fish to a halt.

If desired, a setscrew 170 may be threaded within the upper end of the internally threaded bushing 68 to limit the amount which the knob 66 can be turned to increase the braking pressure. The setscrew 170 can be preset by turning the knob 66 to provide the maximum braking pressure desired, and then turning the setscrew 170 into abutting relationship with the end of the threaded portion 70. Thereafter, whenever braking pressure is increased by rotating the knob 66, it can only be increased until the setscrew again abuts against the upper end of the threaded portion 70 of the stem 44.

What is claimed is:
1. A fishing reel comprising a housing, a rotatable hollow shaft on said housing, an axially movable shaft within said hollow shaft, a tubular body on said hollow shaft for rotation therewith, a spool on said axially movable shaft for reciprocation within said body, gear means for rotating said hollow shaft and body, linking means connected between said gear means and axially movable shaft and operated by the former for reciprocating the axially movable shaft and moving the spool in and out of the body, said spool having a cylindrical recessed portion adapted to have a fishing line wound thereon and a radially flanged portion extending outwardly at the exposed end, a finger mounted on said tubular body having one end thereof adapted to closely overlie said flanged portion of the spool when said spool is retracted within said body, ratchet means for automatically preventing the rotation of said tubular body in one direction when the spool is furthest removed from said body, and manually adjustable ratchet means for preventing the reverse rotation of the body when the line is drawn from the spool.

2. A fishing reel comprising a housing, a rotatable hollow shaft on said housing, an axially movable shaft within said hollow shaft, a tubular body on said hollow shaft for rotation therewith, a spool on said axially movable shaft for reciprocation within said body, gear means for rotating said hollow shaft and body, linking means connected between said gear means and axially movable shaft and operated by the former for reciprocating the axially movable shaft and moving the spool in and out of the body, said spool having a cylindrical recessed portion adapted to have a fishing line wound thereon and a radially flanged portion extending outwardly at the exposed end, a finger rigidly mounted on said tubular body having one end thereof adapted to closely overlie said flanged portion of the spool when said spool is retracted within said body and as the body is rotated in one direction about the spool, ratchet means for automatically preventing the rotation of said tubular body in the other direction when the spool is at its furthest removed position from said body, and manually adjustable ratchet means for preventing reverse rotation of the body when the line is drawn from the spool.

References Cited in the file of this patent
UNITED STATES PATENTS

| | | |
|---|---|---|
| 1,788,098 | Fuller | Jan. 6, 1931 |
| 2,148,786 | Swennes | Feb. 28, 1939 |
| 2,153,556 | Gartin | Apr. 11, 1939 |
| 2,344,209 | Lowe | Mar. 14, 1944 |
| 2,431,493 | McIlrath | Nov. 25, 1947 |
| 2,613,882 | Small | Oct. 14, 1952 |
| 2,615,649 | Flewelling | Oct. 28, 1952 |
| 2,635,714 | Butler | Apr. 21, 1953 |
| 2,687,855 | Shakespeare et al. | Aug. 31, 1954 |
| 2,705,113 | Bonanno | Mar. 29, 1955 |
| 2,728,534 | Wallace | Dec. 27, 1955 |
| 2,728,535 | Young | Dec. 27, 1955 |
| 2,732,730 | Sernaker | Jan. 31, 1956 |
| 2,755,034 | Eisele | July 17, 1956 |
| 2,772,839 | Morton | Dec. 4, 1956 |
| 2,773,655 | Mandolf | Dec. 11, 1956 |
| 2,774,545 | Chambers | Dec. 18, 1956 |
| 2,775,417 | Freund | Dec. 25, 1956 |
| 2,879,954 | Small | Mar. 31, 1959 |

FOREIGN PATENTS

| | | |
|---|---|---|
| 908,659 | France | Oct. 11, 1945 |
| 969,584 | France | May 24, 1950 |
| 917,518 | Germany | Sept. 6, 1954 |
| 383,438 | Great Britain | Nov. 17, 1932 |
| 470,695 | Great Britain | Aug. 19, 1937 |
| 598,126 | Great Britain | Feb. 11, 1948 |
| 296,281 | Switzerland | Apr. 17, 1954 |